United States Patent [19]

Buchanan

[11] Patent Number: 5,779,213
[45] Date of Patent: Jul. 14, 1998

[54] BOOK SUPPORT

[76] Inventor: Robert Alan MacGregor Buchanan, 13 Arlington Cottages, Sutton Lane, London W4 4HB, United Kingdom

[21] Appl. No.: 802,796

[22] Filed: Feb. 18, 1997

[30] Foreign Application Priority Data

Feb. 19, 1996 [GB] United Kingdom ............. 9603449

[51] Int. Cl.⁶ ............................................. A47G 1/24
[52] U.S. Cl. ........................... 248/455; 248/188.4
[58] Field of Search .......................... 248/454, 455, 248/188.4, 441.1; 40/341

[56] References Cited

U.S. PATENT DOCUMENTS

| 772,473 | 10/1904 | Olcott | 248/441.1 |
| 1,666,803 | 4/1928 | Walker | 248/454 |
| 3,408,032 | 10/1968 | Francis | 248/454 X |
| 4,080,070 | 3/1978 | Spence-Bate | |
| 4,470,571 | 9/1984 | Hartman | 248/452 |
| 4,655,478 | 4/1987 | Maylon | |
| 4,976,408 | 12/1990 | Hertlein et al. | |
| 5,072,252 | 12/1991 | Howseman, Jr. | |

*Primary Examiner*—Milton Nelson, Jr.
*Attorney, Agent, or Firm*—Browdy and Neimark

[57] ABSTRACT

A book support of the type used to support books of an old or delicate construction allows the books to be opened and held steadily. The support (10) comprises an upright platform (11) which is rotatable about an axis (A) and a horizontal platform (12) which is suspended below the plane (A–C) in which the axis (A) lies. Horizontal platform (12) is rotatably suspended at the end nearest the axis (A) and at the end furthest from the axis (A). Thus, horizontal platform (12) can be moved upwards and away from vertical platform (11) as the pages of a book are turned from lying against horizontal platform (11) to lying against vertical platform (12).

20 Claims, 3 Drawing Sheets

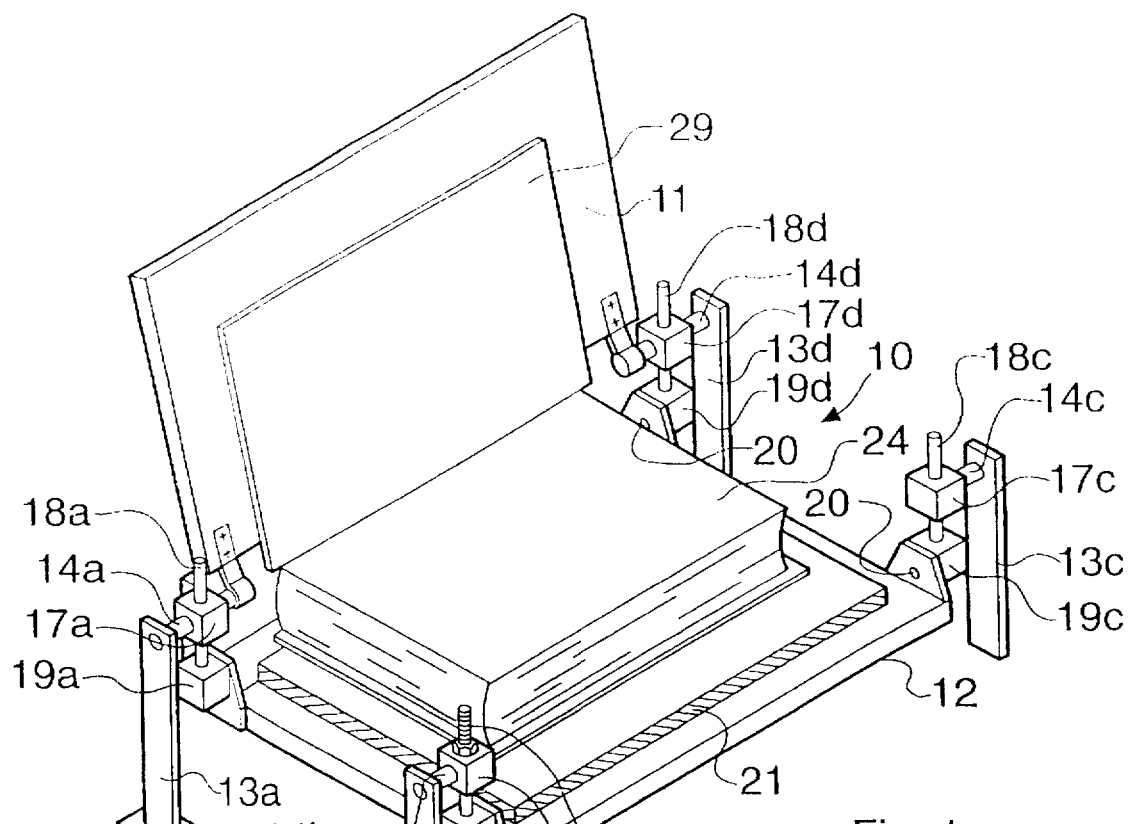
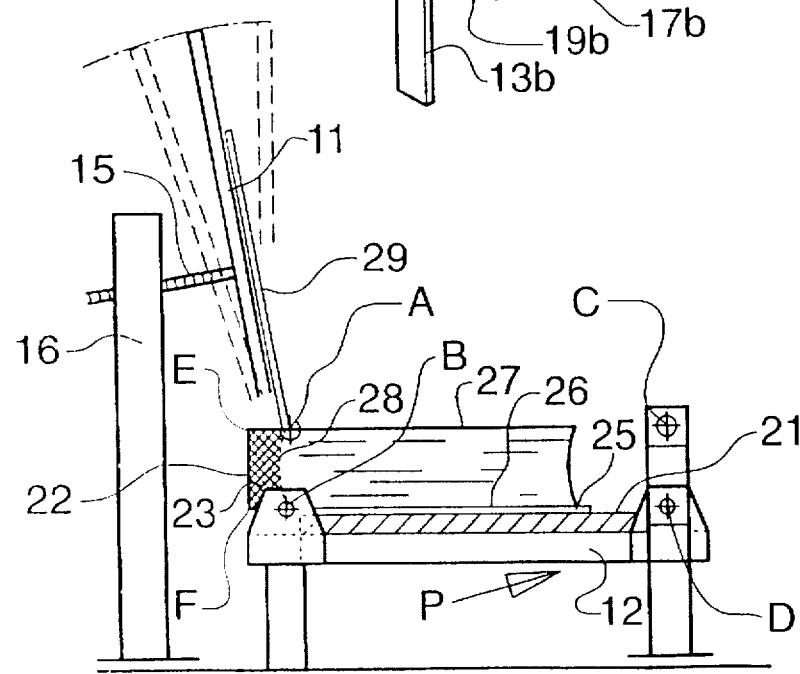

BOOK SUPPORT

The present invention relates to a book support.

Books of an old or delicate construction require proper support that allows them to be opened and held steadily and reliably so that each page may be turned to allow individual pages to be read, photographed, imaged digitally or for any other purpose.

In the prior art, a book support is known which comprises a series of foam rubber wedges which are placed underneath the open book. One disadvantage of such wedges is that they require major adjustment of the book's geometry to take place after, say, every 10 pages turned. Furthermore, the wedges tend to have a limited life because the foam rubber material tends to perish.

Also known in the prior art is a cradle for supporting a book to allow the book to be copied. Such a cradle comprises a fixed horizontal platform on which the book is laid and a fixed, inclined side wall to which the opened cover and turned-over pages of the book are secured by means of cord. One disadvantage of this cradle is that the spine of the book is not supported and therefore the weight of the upright (open) part of the book bears on the spine. This may cause permanent damage to the spine of a fragile book.

According to the present invention, there is provided a book support comprising:

a first, generally rectangular, book-supporting platform pivotable around a first axis (A) so as to be held at a predetermined angle relative to a plane (A–C) in which said first axis (A) is located; and a second, generally rectangular, book-supporting platform suspended below said plane (A–C) at (i) at least one position on a first line (B), which first line is at or near, and parallel to, the end of the second platform which is proximal said first axis, and (ii) at least one position on a second line (D), which second line is at or near, and parallel to, the end of the second platform which is distal said first axis, the second platform being movable so that said first line (B) is rotatable around said first axis (A) and said second line (D) is rotatable around a second axis (C), which second axis (C) is located in said plane (A–C).

The book support of the present invention is such that, in use, a book is placed on the second platform with said first line being located below said first axis and said second line being located below said second axis. The first platform is rotated and fixed so as to be at a chosen angle relative to the plane in which said first and second axes lie so that the top cover of the book can be opened to lie against the first platform. As the pages of the book are turned from lying parallel to the second platform to lying parallel to the first platform, the second platform is moved gradually in the direction away from the first platform. The rotation of the first and second lines around the first and second axes reduces the stresses imparted on the spine of the book. Thus continuous, adjustable support for the whole book is provided as the pages are turned from beginning to end.

The book support may further comprise a channel connecting the first and second platforms. In use, the channel may be filled with a resilient material so as further to support the spine of the book.

The book support may include means for moving said second platform, such as a rack and pinion arranged such that a shaft can be operated to turn the pinion which moves the second platform and, when the pinion is no longer turned, the second platform remains in a new position until the pinion is turned again. Alternatively, the second platform can be suspended in such a manner that, when it is moved, it retains its new position.

Preferably, the second, generally-rectangular book-supporting platform is suspended at or near each corner by a suspension member connected to a support column.

Preferably, the distance that the second platform is suspended below the plane in which the first and second axes lie is adjustable.

The second, generally-rectangular book-supporting platform may include a layer of resilient material.

For a better understanding of the invention, and to show how the same may be carried into effect, reference will now be made, by way of example only, to the accompanying drawings, in which:

FIG. 1 is an isometric projection of a book support in accordance with the present invention, showing a book with its cover opened;

FIG. 2 is a partial schematic side view of the book support as shown in FIG. 1;

Figure 3:
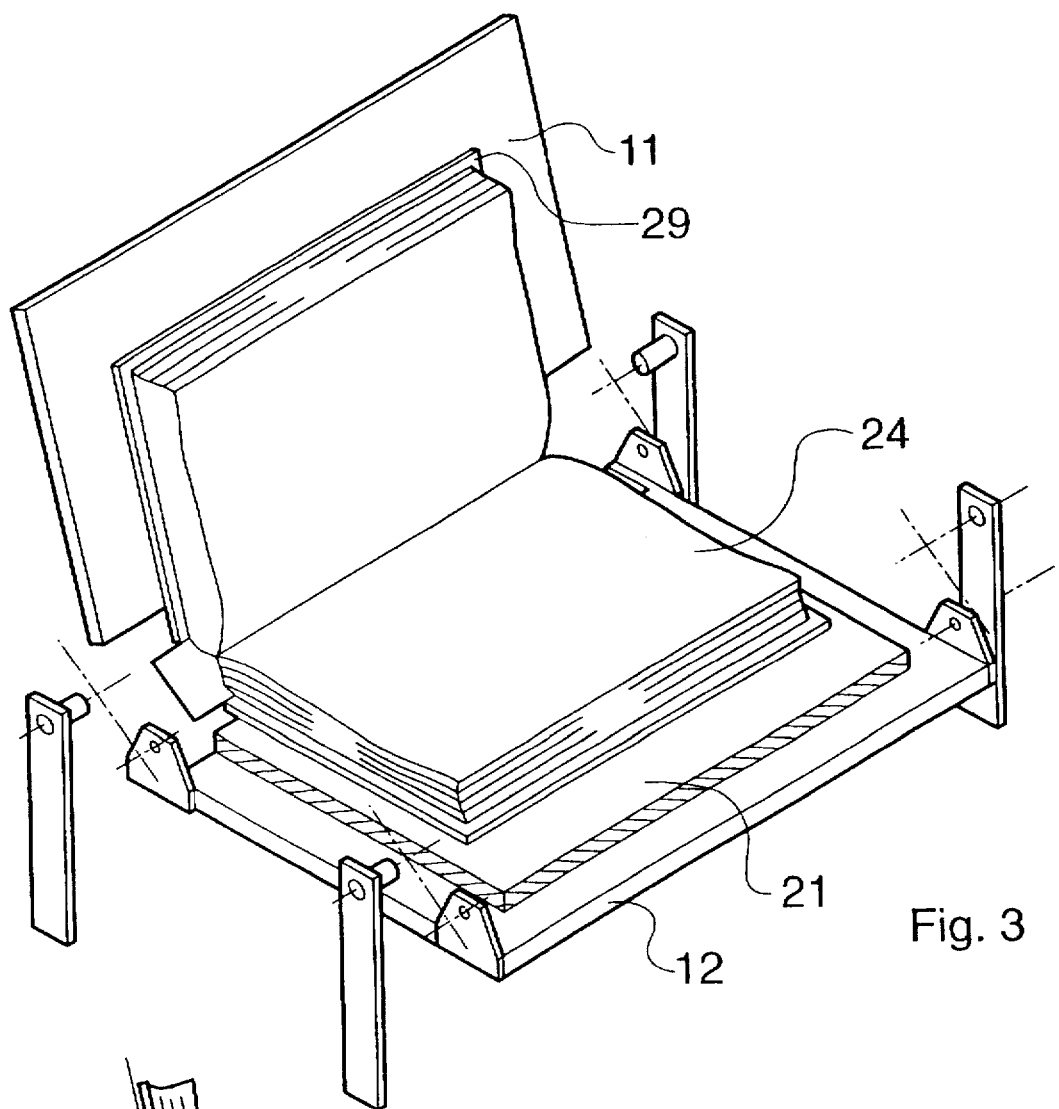
FIG. 3 is a view similar to FIG. 1, but with half of the leaves of the book turned through an angle of 100°.

Referring to the drawings, a book support 10 comprises an upright platform 11 and a horizontal platform 12.

The respective platforms 11,12 are supported on support columns 13a, 13b, 13c and 13d from each of which projects a shaft 14a, 14b, 14c and 14d.

Upright platform 11 is secured to shafts 14a and 14d so as to be rotatable therearound. The shafts 14a and 14d are an exemplary first pivot. The angle of inclination of the upright platform 11 is adjustable by means of a threaded rod 15 which passes through a fixed support 16. Accordingly, the further that threaded rod 15 is passed through fixed support 16, the more vertical the upright platform 11 becomes disposed (see FIG. 2). It will be appreciated that other means can be used to adjust the angle of the upright platform 11, provided that the angle can be maintained when the book support 10 is in use (see below).

Also rotatably located on each shaft 14a–d is a sleeve member 17a–d. A rod 18a–d passes through each sleeve member 17a–d and is secured at its lower end to a stop member 19a–d. Each rod includes a thread and a nut so that each stop member 19a–d can be moved towards and away from each sleeve member 17a–d. Horizontal platform 12 is rotatably secured to stop members 19a–d by means of a stud 20 projecting from each stop member 19a–d. Thus, the distance that horizontal platform 12 sits below shafts a–d is adjustable by means of sleeve members 17a–d and their respective nuts. This arrangement allows books of differing thicknesses to be used on the book support.

The respective studs projecting from stop members 19a and 19d define between them a line which is parallel to the end of horizontal platform 12; in the drawings, this line is indicated by the letter B. Similarly, the respective studs projecting from stop members 19a and 19d define between them a line which is parallel to the end of horizontal platform 12; in the drawings, this line is indicated by the letter D. Shafts 14a and 14d define between them a line which, in the drawings, is indicated by the letter A. Similarly, shafts 14b and 14c define between them a line which is indicated by the letter C in the drawings.

Horizontal platform 12 is suspended such that it can move to the right and upwards (as shown in the drawings) with sleeve members 17a–d rotating about shafts 14a–d, and stop members 19a–d rotating about respective studs (see FIG. 2). A means for controllably applying a force P (see FIG. 2) to move horizontal platform 12 in this manner is provided (not shown). One example of such a means is a manually-operated handle that turns a pinion that drives a rack.

Horizontal platform 12 need not be suspended in the above-described manner. For example, it is possible that horizontal platform 12 could be suspended at a single position on lines B and D, rather than two positions as in the illustrated embodiment.

A layer of compressible resilient material 21, such as plastic foam, sits on horizontal platform 12. One suitable foam material is Zotefoam EV 50.

Platform 10 also includes a channel 22 (best seen in FIG. 2) for receiving compressible, resilient material 23 for supporting the spine of a book to be received on the platform. The channel may be formed by means of an L-shaped section supported on horizontal platform 12 with the horizontal portion of the "L" forming the bottom of the channel and the vertical portion thereof forming the side of the channel. The top of the channel is formed by a horizontally plate projecting from line A. This arrangement enables the depth of the channel 22 to be adjusted when the distance that horizontal platform 12 sits below lines A and C is adjusted (see below).

The channel illustrated in the drawings is intended for books whose spine has the same or a smaller width than the width of the remainder of the book (i.e. upper and lower boards and textblock). However, if a book has a spine which is wider than the remainder of the book, an alternative form of channel may be required. In this case, the upper and lower surfaces of the channel diverge from one another in the direction away from the horizontal platform 12 (i.e. to the left in FIGS. 2, 4 & 6) to accommodate the spine of the book.

In use, the angle of upright platform 11 is first adjusted to an angle relative to the horizontal platform 12 at which a book will comfortably open. In the drawings, this angle is 100° to the horizontal platform, which allows the part of the book on the horizontal platform 12 to be seen or photographed easily from above. The angle can be greater or less than 100°; if the angle is less than 90° direct viewing of the part of the book on the horizontal platform is impaired by the part on the upright platform and mirrors or prisms may have to be employed to view the book.

A book 24 is laid on the layer of compressible material 21, which is of a thickness equal to the height of lines B and D above the horizontal platform, less the thickness of the book's lower board 25. Thus the lower surface 26 of the textblock of the book 24 lies in the same plane as lines B and D. The distance that horizontal platform 12 sits below lines A and C will have been adjusted by means of sleeve members 17a–d and their associated nuts so that the book can sit in this way. In many cases, horizontal platform will be adjusted so that distance A–B equals C–D. However, if the book is thicker or thinner at its foredge than its spine, A–B can be smaller or larger than C–D, respectively.

The layer of compressible material 21 is provided because each book has its own internal idiosyncrasies such that the depth of the textblock or the width of the spine varies during the process of turning the pages and consequent rotation of textblock and spine around line A. The layer of compressible material 21 permits such minor variations.

The height of the horizontal platform 12 is adjusted by means of the nuts on threaded rods 18a–d so that the upper surface 27 of the textblock is in the same plane as lines A and C. Compressible material 23 is also placed in the channel 22 that connects platforms 11,12 to support the spine 28 of the book 24.

The upper board 29 of the book is then turned through 100° (the position shown in FIGS. 1 and 2), followed by each leaf. As leaves are turned, they are held in place against the upright platform 11. Means for this are well-known in the art.

As successive leaves are turned through 100°, a force, P (see FIG. 2) is applied to the horizontal platform 12 so that it moves to the right and upwards as seen in the drawings. Lines B and D travel along arcs of circles of radius A–B. In the case of line B, the circle's center is at A and, in the case of line D, the circle's center is at C. This movement of the horizontal platform 12 avoids stresses being placed on the spine 28.

Figure 4:
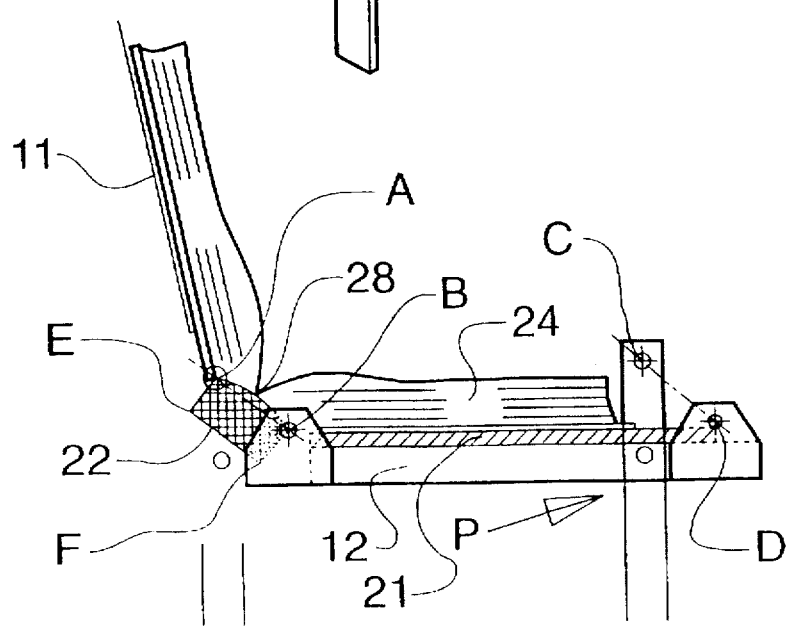
FIG. 4 is a partial schematic side view of the book support as shown in FIG. 3.

FIGS. 3 and 4 depict the situation when half of the leaves have been turned through 100°. It will be seen that lines B and D have rotated through 50° about lines A and C, respectively. Compressible material 23 is actively supporting the spine 28 in the shape that the spine 28 needs to adopt.

Figure 5:
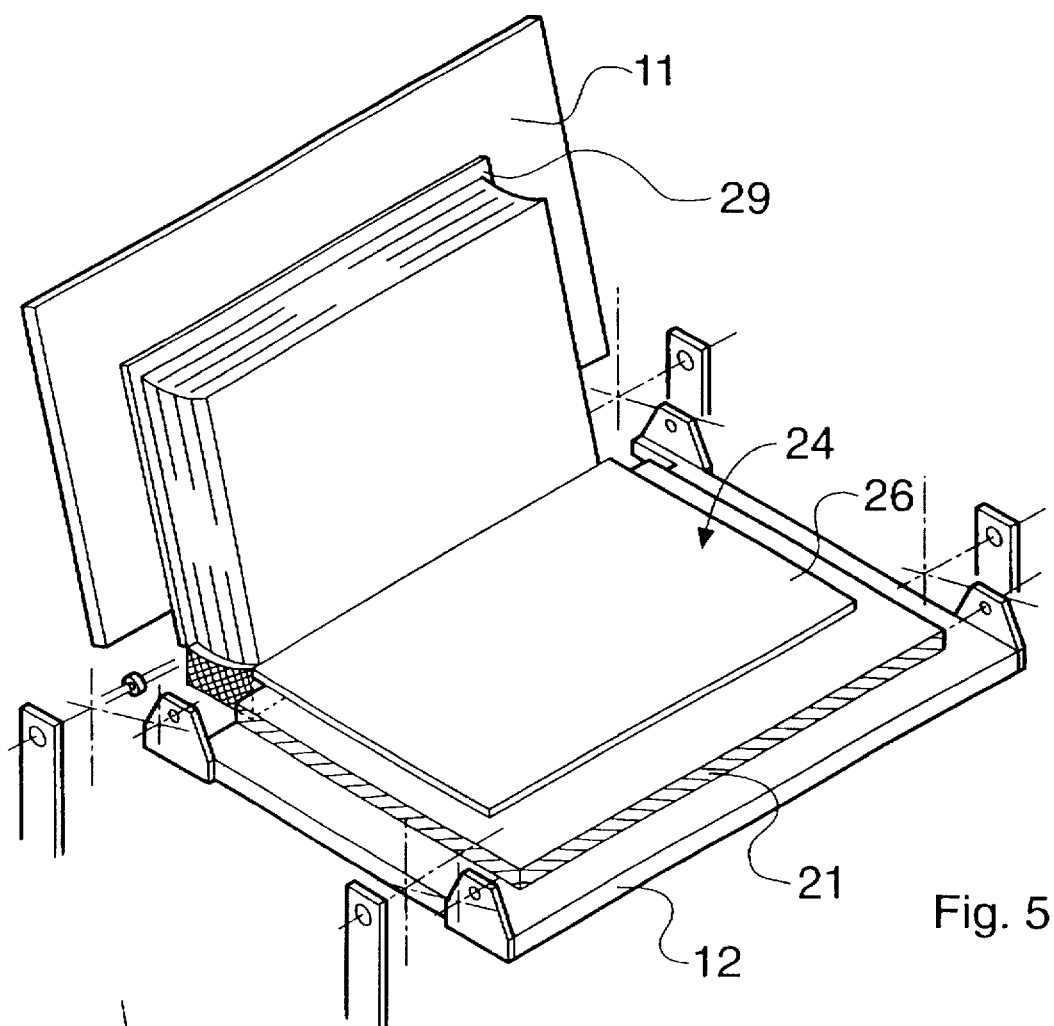
FIG. 5 is a view similar to FIG. 1, but with all of the leaves of the book turned through an angle of 100°.
Figure 6:
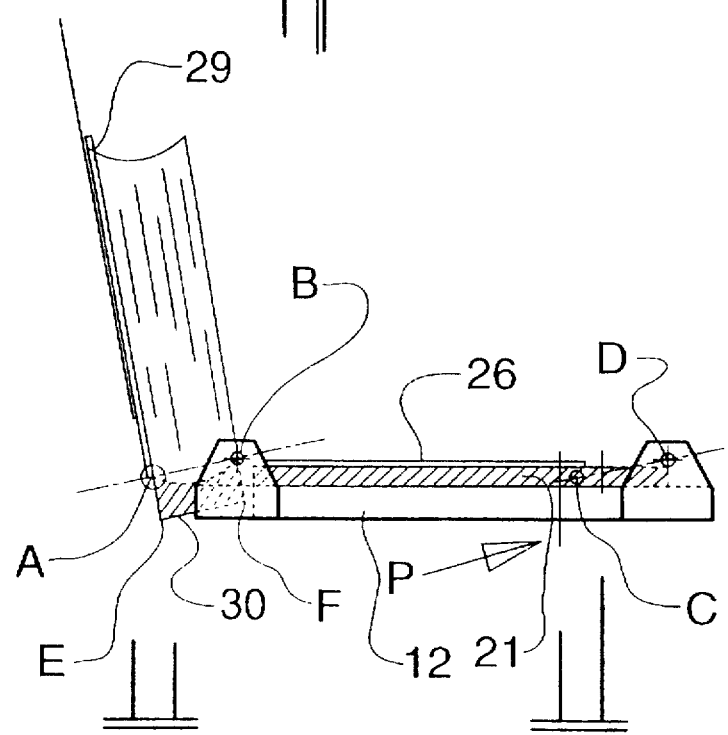
FIG. 6 is a partial schematic side view of the book support as shown in FIG. 5.

FIGS. 5 and 6 show the position when all the leaves have turned through 100° but the lower board 25 of the book 24 remains supported by the horizontal platform 12. It will be appreciated that the whole textblock has rotated through 100° about the line A. The book's spine 28 has flexed each side of a line A–B so that this line and the spine 28 have also gradually rotated through 100° about line A. All the while, the spine 28 is supported by compressible material 23.

The book support of the present invention is suitable for allowing photography or digital imagery of books, whereby a camera is positioned directly above the page to be photographed. In the accompanying drawings, the book support has been illustrated with one platform (platform 12) perpendicular to the vertical. However, this arrangement is not essential and it is possible in the present invention that the platforms are both arranged such that they are at an angle to the vertical. For example, if the angle between the respective platforms is to be 100° so that the book is opened 100°, each platform 11, 12 can be at an angle of 50° to the vertical. The line of the camera lens is perpendicular to the page being photographed.

I claim:

1. A book support comprising:
   a first, generally rectangular, book-supporting platform pivotable on a first pivot around a first axis (A) so as to be held at a predetermined angle relative to a plane (A–C) in which the first axis (A) is located; and
   a second, generally rectangular, book-supporting platform suspended below the plane (A–C) at (i) at least one position on a first line (B), which first line is approximately coincident with, and parallel to, the end of the second platform which is proximal the first axis, and (ii) at least one position on a second line (D), which second line is approximately coincident with, and parallel to, the end of the second platform which is distal the first axis,
   the second platform being movable on second pivots so that the first line (B) is rotatable around the first axis (A) and the second line (D) is rotatable around a second axis (C), which second axis (C) is located in the plane (A–C).

2. A book support as claimed in claim 1, wherein the second, generally rectangular, book-supporting platform is suspended in such a manner that, when it is moved, it retains its new position.

3. A book support as claimed in claim 1, wherein the second, generally-rectangular book-supporting platform is suspended approximately coincident with each corner thereof by a suspension member connected to a support column.

4. A book support as claimed claim 1, wherein the distance that the second platform is suspended below the plane in which the first and second axes lie is adjustable.

5. A book support as claimed in claim 1, wherein the second, generally-rectangular book-supporting platform includes a layer of resilient material.

6. A book support as claimed in claim 1, wherein the plane (A–C) is at an angle to the vertical.

7. A method of viewing a book using a book support as claimed in claim 1, comprising:
   placing a book to be viewed on the second platform with the first line being located below the first axis and the second line being located below the second axis;
   rotating and fixing the first platform at a chosen angle relative to the plane in which the first and second axes lie so that the top cover of the book can be opened to lie against the first platform; and
   moving the second platform in the direction away from the first platform as the pages of the book are turned from lying parallel to the second platform to lying parallel to the first platform.

8. A book support as claimed in claim 1, further comprising a channel connecting the first and second platforms for receiving a spine of a book.

9. A book support as claimed in claim 8, wherein the channel is filled with a resilient material.

10. A book support as claimed in claim 1, further comprising means for moving the second platform.

11. A book support as claimed in claim 10, wherein the means for moving the second platform is a rack and pinion arranged such that a shaft can be operated to turn the pinion which moves the second platform and, when the pinion is no longer turned, the second platform remains in a new position until the pinion is turned again.

12. A book support as claimed in claim 9, further comprising means for moving the second platform.

13. A book support as claimed in claim 12, wherein the second, generally-rectangular, book-supporting platform is suspended in such a manner that, when it is moved, it retains its new position.

14. A book support as claimed in claim 13, wherein the second, generally-rectangular book-supporting platform is suspended approximately conicident with each corner thereof by a suspension member connected to a support column.

15. A book support as claimed in claim 14, wherein the distance that the second platform is suspended below the plane in which the first and second axes lie is adjustable.

16. A book support as claimed in claim 12, wherein the means for moving the second platform is a rack and pinion arranged such that a shaft can be operated to turn the pinion which moves the second platform and, when the pinion is no longer turned, the second platform remains in a new position until the pinion is turned again.

17. A book support as claimed in claim 13, wherein the second, generally-rectangular book-supporting platform is suspended approximately conincident with each corner thereof by a suspension member connected to a support column.

18. A book support as claimed in claim 17, wherein the distance that the second platform is suspended below the plane in which the first and second axes lie is adjustable.

19. A book support as claimed in claim 18, wherein the second, generally-rectangular book-supporting platform includes a layer of resilient material.

20. A book support as claimed in claim 19, wherein the plane (A–C) is at an angle to the vertical.

* * * * *

UNITED STATES PATENT AND TRADEMARK OFFICE
CERTIFICATE OF CORRECTION

PATENT NO. : 5,779,213
DATED : July 14, 1998
INVENTOR(S) : Robert A.M. Buchanan

It is certified that error appears in the above-identified patent and that said Letters Patent is hereby corrected as shown below:

Column 2, line 55-56 delete "19a amd 19d" and insert --19b and 19c--.

Signed and Sealed this

Twenty-third Day of February, 1999

Attest:

Q. TODD DICKINSON

Attesting Officer

Acting Commissioner of Patents and Trademarks